United States Patent
Lee et al.

(10) Patent No.: US 9,467,187 B2
(45) Date of Patent: Oct. 11, 2016

(54) METHOD FOR SELECTING MOBILE COMMUNICATION NETWORK PROVIDER USING PROVISIONING PROFILE, AND APPARATUS USING SAME

(71) Applicant: KT Corporation, Seongnam-si (KR)

(72) Inventors: Hyung Jin Lee, Seoul (KR); Kwan Lae Kim, Seoul (KR); Chul Hyun Park, Seoul (KR); Myoung Hee Seo, Seoul (KR); Jin Hyoung Lee, Seoul (KR); Youn Pil Jeung, Seoul (KR)

(73) Assignee: KT Corporation, Seongnam-si (KR)

( * ) Notice: Subject to any disclaimer, the term of this patent is extended or adjusted under 35 U.S.C. 154(b) by 0 days.

(21) Appl. No.: 14/649,776

(22) PCT Filed: Dec. 5, 2013

(86) PCT No.: PCT/KR2013/011238
§ 371 (c)(1),
(2) Date: Jun. 4, 2015

(87) PCT Pub. No.: WO2014/092385
PCT Pub. Date: Jun. 19, 2014

(65) Prior Publication Data
US 2015/0349825 A1    Dec. 3, 2015

(30) Foreign Application Priority Data
Dec. 11, 2012  (KR) .................. 10-2012-0143252

(51) Int. Cl.
*H04B 1/38*      (2015.01)
*H04B 1/3816*    (2015.01)
(Continued)

(52) U.S. Cl.
CPC ......... *H04B 1/3816* (2013.01); *H04L 63/0853* (2013.01); *H04L 63/102* (2013.01); *H04W 8/205* (2013.01); *H04W 12/06* (2013.01); *H04W 76/02* (2013.01); *H04W 88/02* (2013.01)

(58) Field of Classification Search
CPC .. H04B 1/3816; H04W 88/06; H04W 48/18; H04W 12/06; H04M 15/751
USPC ................ 455/558, 550.1, 435.2, 403, 435.1
See application file for complete search history.

(56) References Cited

U.S. PATENT DOCUMENTS 5,764,730 A  *  6/1998  Rabe ................. H04M 1/72563
                                                 455/403
7,715,822 B2 *  5/2010  Semple .............. H04L 63/0853
                                                 455/411
(Continued)

FOREIGN PATENT DOCUMENTS

WO    2011/115407 A2    9/2011

OTHER PUBLICATIONS

"Feasibility study on the security aspects of remote provisioning and change of subscription for Machine to Machine (M2M) equipment (Release 9)", TSGSA, Jun. 2010, 3GPP TR 33.812 V9.2.0.
(Continued)

*Primary Examiner* — Sonny Trinh
(74) *Attorney, Agent, or Firm* — Sughrue Mion, PLLC (57) ABSTRACT

Disclosed are a method for selecting a specific provisioning profile from among a plurality of provisioning profiles and an apparatus using same. In a terminal to which an embedded UICC (eUICC) is mounted, the eUICC includes at least one provisioning profile wherein each of the one or more provisioning profile enables a user terminal to communicate with a subscriber management entity supporting at least one network provider. Accordingly, a specific provisioning profile can be selected from among the one or more provisioning profiles, and a network can be connected with a specific mobile communication provider using the selected provisioning profile.

17 Claims, 5 Drawing Sheets

(51) Int. Cl.
*H04W 88/02* (2009.01)
*H04W 76/02* (2009.01)
*H04W 12/06* (2009.01)
*H04W 8/20* (2009.01)
*H04L 29/06* (2006.01)

(56) References Cited

U.S. PATENT DOCUMENTS

| | | | | |
|---|---|---|---|---|
| 8,180,400 B2* | 5/2012 | Shin | ............... | H04M 1/72519 455/435.2 |
| 2009/0029736 A1* | 1/2009 | Kim | ............... | H04M 1/72522 455/558 |
| 2011/0269461 A1* | 11/2011 | Xu | ............... | H04W 8/183 455/435.2 |
| 2011/0306318 A1 | 12/2011 | Rodgers et al. | | |

OTHER PUBLICATIONS

Denis Praca, "Embedded UICC challenges and standardization status", Smart Event 2011, Sep. 2011 <http://www.smart-event.eu/II/proceedings/e-smart/gemalto_embedded_denis_praca.pdf>.

Michael Walker, "Embedded SIMs and M2M Communications", ETSI Security Workshop, Jan. 20, 2011, <http://docbox.etsi.org/workshop/2011/201101_securityworkshop/s4_mobiile_wireless_security/walker_embeddedsims.pdf>.

* cited by examiner

METHOD FOR SELECTING MOBILE COMMUNICATION NETWORK PROVIDER USING PROVISIONING PROFILE, AND APPARATUS USING SAME

CROSS-REFERENCE TO RELATED APPLICATIONS

This application claims the benefit of priority from Korean Patent Application No. 10-2012-0143252, filed on Dec. 11, 2012, the disclosure of which is incorporated herein by reference in its entirety. This application is a National Stage Entry of the PCT Application No. PCT/KR2013/011238 filed on Dec. 5, 2013, the entire disclosure of which is also incorporated herein by reference in its entirety.

BACKGROUND

1. Field

An apparatus and a method consistent with exemplary embodiments broadly relate to a subscriber authentication module having a plurality of provisioning profiles, and more particularly, to a method of selecting a certain provisioning profile among a plurality of provisioning profiles and an apparatus using the same.

2. Description of the Related Art

A Universal Integrated Circuit Card (UICC) is a smart card that is tangible and may be inserted into a terminal configured to authenticate a user to access a mobile communication network to which the user is subscribed. The UICC may be referred to as a Subscriber Identity Module (SIM) card for a Global System for Mobile communication (GSM), and may be referred to as a Universal Subscriber Identity Module (USIM) card for a Wideband Code Division Multiple Access (WCDMA) or Long Term Evolution (LTE).

The UICC may store network information about a mobile network operator to which a user has subscribed, for example, International Mobile Subscriber Identity (IMSI) and Home Public Land Mobile Network (HPLMN), and user information, for example, Short Message Service (SMS) and a phonebook of a user.

A terminal having an UICC mounted thereon automatically performs a user authentication with respect to a mobile communication network, to which a user has subscribed, by using the information stored in the UICC, so that the user may conveniently receive mobile communication services through the terminal.

Meanwhile, a user may easily change a terminal by demounting or removing an UICC from the existing terminal, and mounting or installing the UICC onto or into a new terminal. In addition, a user may easily change a mobile network operator by replacing an UICC demounted or removed from the existing terminal with an UICC of a desired network operator.

There may be a structure for which it may be difficult to remove or demount an UICC from a terminal; for example, when an UICC is mounted in a Machine to Machine (M2M) terminal, it is difficult to replace the UICC from outside.

In addition, in order to improve durability, shock resistance and heat resistance than in the existing UICC having a detachable plastic structure, there is suggested a structure of an Embedded UICC (hereinafter, referred to as eUICC) that may provide the same service as that provided by a detachable UICC even if the UICC is provided in the form of a chip and is integrally formed with a terminal rather than a detachable structure.

The eUICC may provide the same network access authentication function as that of the existing detachable UICC, but due to its physical difference from the detachable UICC, there is burden to processing network accesses of multiple network operators by using a single UICC, leaving various issues unresolved regarding eUICC establishment/distribution/subscriber information security.

In particular, there is a need for a technology to select a certain provisioning profile in a terminal including an eUICC when one or more provisioning profiles are included in the eUICC.

SUMMARY

An aspect of exemplary embodiments is to provide a terminal including a subscriber authentication module configured to select a provisioning profile from among at least one provisioning profile and use the selected provisioning profile.

Another aspect of exemplary embodiments are directed to providing a method of communicating with a network operator selected by a user by establishing a connection using a selected provisioning profile from among at least one provisioning profile.

Illustrative, non-limiting embodiments may overcome the above disadvantages and other disadvantages not described above. The inventive concept is not necessarily required to overcome any of the disadvantages described above, and the illustrative, non-limiting embodiments may not overcome any of the problems described above. The appended claims should be consulted to ascertain the true scope of an inventive concept.

According to an exemplary embodiment, a terminal provided with an embedded UICC (eUICC) mounted thereon, wherein the eUICC includes at least one provisioning profile, and each of the at least one provisioning profile enables communication with a subscription manager that supports at least one network operator is provided.

Each of the at least one provisioning profile may include information related to the subscription manager and information for establishing a connection or for allowing communication with the subscription manager, and an authentication credential for performing an authentication.

The authentication credential may conform to an Authentication and Key Agreement (AKA) scheme.

The terminal may access the subscription manager by using a provisioning profile selected from among the at least one provisioning profile.

The terminal may receive network operator information from the at least one network operator supported by the accessed subscription manager, and download an operational profile for a network operator based on the network operator information.

The terminal may provide a user interface for selecting the network operator from the at least one network operator.

Another aspect of an exemplary embodiment may provide a method of selecting a network operator in a terminal provided with an embedded UICC (eUICC) mounted thereon, the method including: accessing at least one subscription manager by using at least one provisioning profile stored in the eUICC; receiving information about a list of network operators supported by each of the at least one subscription manager, from the at least one subscription manager; and selecting a provisioning profile for establishing communication with a subscription manager that supports a network operator based on the information about the list of network operators.

The method may further include accessing the subscription manager by using the selected provisioning profile, and receiving network operator information from at least one network operator supported by the accessed subscription manager.

The method may further include downloading an operational profile for the network operator based on the network operator information.

Another aspect of an exemplary embodiment provides a method of selecting a network operator in a terminal provided with an embedded UICC (eUICC) mounted thereon, the method including: selecting a provisioning profile stored on the eUICC from among at least one provisioning profile stored on the eUICC; accessing a subscription manager by using the selected provisioning profile; and receiving network operator information from at least one network operator supported by the accessed subscription manager.

The method may further include downloading an operational profile for a network operator based on the network operator information.

The provisioning profile may be selected by selecting the network operator.

According to exemplary embodiments, the terminal having an eUICC mounted thereon can select a certain provisioning profile from among at least one provisioning profile, and establish a network connection with a certain mobile network operator by using the selected provisioning profiling.

In addition, according to exemplary embodiments, the method of selecting a network operator can request a list of supportable network operators from a subscription manager by using a terminal having at least one provisioning profile, and based on the list of supportable network operators received in response to the request, select a certain network operator for establishing a connection based on user selection.

Furthermore, according to exemplary embodiments, the method of selecting a network operator can improve establishing of connections when multiple network operators are present by using the eUICC mounted on or in the terminal.

BRIEF DESCRIPTION OF DRAWINGS

Non-limiting and non-exhaustive exemplary embodiments will be described in conjunction with the accompanying drawings. Understanding that these drawings depict only exemplary embodiments and are, therefore, not to be intended to limit its scope, the exemplary embodiments will be described with specificity and detail taken in conjunction with the accompanying drawings, in which.

DETAILED DESCRIPTION OF EXEMPLARY EMBODIMENTS

Exemplary embodiments are described herein. However, specific structural and functional details disclosed herein are merely representative for purposes of describing exemplary embodiments, and exemplary embodiments may be embodied in many alternative forms and should not be construed as limiting.

Accordingly, while the disclosure is subject to various modifications and alternative forms, exemplary embodiments thereof are shown by way of an example only with reference to the drawings and will be described herein in detail. It should be understood, however, that there is no intention to limit the disclosure to the particular forms described herein. On the contrary, the disclosure covers all modifications, equivalents, and alternatives falling within the spirit and scope of an inventive concept. Analogous references refer to analogous elements throughout the description of the figures according to exemplary embodiments.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of exemplary embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

"A subscriber authentication module" used herein is an embedded UICC (eUICC) or an embedded SIM (eSIM)

being distinguished from the existing detachable UICC, and represent an embedded Subscriber Identity Module (SIM) integrally mounted on or in a terminal at the time of manufacturing the terminal.

The terminology "a terminal" used herein may be referred to as a mobile station (MS), a user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, a mobile or other terminologies. Examples of the terminal may include a cellular phone, a smart phone having a wireless communication function, a personal digital assistant (PDA) having a wireless communication function, a wireless modem, a personal computer having a wireless communication function, a photographing apparatus, such as a camera, having a wireless communication function, a gaming apparatus having a wireless communication function, a music storage and playback home appliance having a wireless communication function, an Internet home appliance performing a wireless Internet access and Internet browsing, and a portable unit or portable terminal incorporating a combination of such functions.

In addition, the terminal may include a Machine to Machine (M2M) terminal and a Machine Type Communication (MTC) terminal/device, but exemplary embodiments are not limited thereto.

A profile on an eUICC may include unique data of a network operator and key information, and a network operator or a third network operator having a permission received from a network operator may generate and manage such a profile.

Files, including a Master File (MF), a Dedicated File (DF), an Application Dedicated File (ADF), and an Elementary File (EF), and a Credential that may be stored in an eUICC, are defined as a profile, according to an exemplary embodiment.

The terminal may access a mobile communication network or authenticate a user by using the profile of the eUICC. The profile may be used as a storage space for user information, for example, Short Message Service (SMS), Multimedia Message Service (MMS), and a phone book.

The profile may be divided into a provisioning profile, an operational profile, and a user profile.

When an eUICC is not connected with a mobile network operator (MNO), the provisioning profile represents a file configured to provide network access information allowing an access to a mobile communication network to support establishing a connection to a MNO. That is, when a terminal has an eUICC not connected to an MNO, a provisioning profile may provide information needed to establish a connection to a mobile communication network so as to load an operational profile for the connection. In this regard, according to an exemplary embodiment, a mobile communication network to which an access request is made may be not designated, (that is, a network of a random MNO), or may be a network of a predetermined MNO. The eUICC may include one or more provisioning profiles. In addition, there may be an eUICC including no provisioning profile.

The operational profile represents a file configured to provide MNO network access information, which is used to receive a service by accessing a network of an MNO that is connected to an eUICC. The eUICC may include one or more operational profiles, and if the eUICC does not include a provisioning profile, the operational profile may serve as the provisioning profile, according to an exemplary embodiment.

The user profile represents a file provided as a storage space for user information, such as an SMS, MMS, and a phone book. The user profile may be provided as an independent entity, or may be included in an operational profile.

A provisioning profile stored in an eUICC may be provided in the form of an Application Dedicated File (ADF) among the file structures of an eUICC. The ADF is the highest node among Elementary Files (EF) used in a certain application. When an EF of a certain application is read and written, the application needs to be selected first, and then a subordinate EF should be selected.

An application identification (AID) of a provisioning profile ADF may include an address configured to select the provisioning profile ADF, and may be stored in an Elementary File Directory ($EF_{DIR}$).

In addition, the AID may include information indicating whether a profile indicated by the AID is a provisioning profile. An operational profile loaded in an eUICC may be also provided in the form of an ADF. An AID of an operational profile ADF may include an address configured to select the operational profile ADF, and may be stored in an $EF_{DIR}$. In addition, the AID of the operational profile ADF may include information indicating whether a profile indicated by the AID is an operational profile.

An initial eUICC may include an ADF for a provisioning profile or an ADF for an operational profile serving as a provisioning profile, according to an exemplary embodiment.

In addition, a mobile communication network may be accessed using a provisioning profile or an operational profile serving as a provisioning profile that is included in an initial eUICC, so as to add ADFs for operational profiles of one or more MNOs. In addition, an ADF for a new provisioning profile may be added.

In an eUICC, one or more provisioning profiles may exist, and a terminal should be able to select a certain provisioning profile according to a particular purpose, need or user's intention.

According to various exemplary embodiments, a method of selecting a certain provisioning profile in a terminal, which includes an eUICC with one or more provisioning profiles, is provided and a method of accessing a network by using the selected provisioning profile and downloading a certain operational profile is also provided.

The terminology used herein "a subscription manager" may represent an external interoperable device, for example, a Subscription Manager (SM) that may generate and manage a profile on an eUICC.

That is, an SM may be regarded as a comprehensive concept including a Subscription Manger-Secure Routing (SM-SR), in which the SM securely performs a function to directly manage operational profiles and provisioning profiles on an eUICC, and a Subscription Manger-Data Preparation (SM-DP), in which the SM prepares operational profiles and provisioning profiles so as to be securely provisioned on an eUICC.

Hereinafter, an exemplary embodiment will be described with reference to the accompanying drawings.

Figure 1:
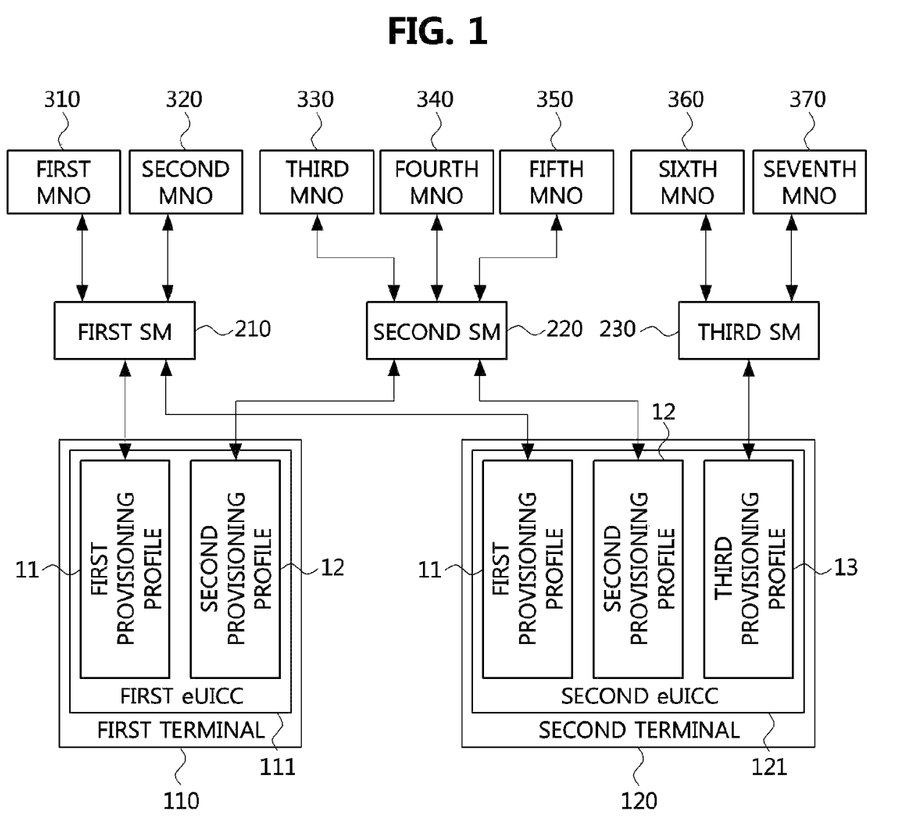
FIG. 1 is a conceptual diagram illustrating a structure in which a terminal provided with an eUICC mounted thereon and including at least one provisioning profile is connected to a network operator by using at least one subscription manager module according to an exemplary embodiment.

FIG. 1 is a conceptual diagram illustrating a structure in which a terminal provided with an eUICC mounted thereon and including at least one provisioning profile is connected to a network operator by using at least one subscription manager module according to an exemplary embodiment.

Referring to FIG. 1, a terminal provided with an eUICC mounted thereon may have at least one provisioning profile, and may communicate with a subscription manager (SM) by individually using each of the at least one provisioning profile, according to an exemplary embodiment. In addition, the terminal may communicate with a mobile network operator (MNO) using the subscription manager (SM). In FIG. 1, each of a first SM 210, a second SM 220 and a third SM 230 may represent a server that is managed by a service provider who manages its subscribers. In addition, each of a first MNO 310 to a seventh MNO 370 may represent a server managed by a respective mobile network operator. Each server, according to an exemplary embodiment, may include at least a memory and a hardware processor.

For example, a first terminal 110 is provided with a first eUICC 111 mounted thereon and having a first provisioning profile 11 and a second provisioning profile 12, which may be used to communicate with the first MNO 310 to the fifth MNO 350 via the first SM 210 and the second SM 220.

In addition, a second terminal 120 is provided with a second eUICC 121 mounted thereon and having a first provisioning profile 11, a second provisioning profile 12, and a third provisioning profile 13, which may be used to communicate with the first MNO 310 to the seventh MNO 370 via the first SM 210, the second SM 220 and the third SM 230.

That is, a terminal may access an SM server by using a provisioning profile included in an eUICC that is mounted on or in the terminal, and download an operational profile provided by each MNO by obtaining MNO information through the SM server, according to an exemplary embodiment.

In detail, each of the provisioning profiles includes information about an SM server to enable a communication with each SM server. In addition, each of the provisioning profile includes an authentication credential to perform an authentication (for example, an authentication key 'K' to perform WCDMA network authentication and LTE network authentication). Including this information in a profile may represent recording information in a profile regardless of the type of information. For example, when a profile is in a form of a file, including of information in a profile may represent recording information in the file regardless of the type described in the file.

For example, the authentication credential may be an Authentication and Key Agreement (AKA) authentication credential, and a terminal with an eUICC may perform a security communication providing an integrity function or ciphering function by using an integrity key or a ciphering key that is generated by performing an AKA authentication with an SM server.

Accordingly, in an exemplary embodiment, a terminal may perform a security communication with one or more SM servers that are defined in at least one provisioning profile included in an eUICC, by using the at least one provisioning profile.

An SM server may communication with at least one MNO server.

The SM server may form an interface to perform a communication with one or more MNO servers. The interface between the SM server and the MNO server may be provided in a wired communication scheme (for example, an optic fiber cable) or a wireless communication scheme (for example, WiFi). In addition, the interface between the SM server and the MNO server may use a secure communication for a reliable communication between the SM server and the MNO server. Accordingly, the SM server may receive an operational profile from a MNO server which is configured to communicate with the SM server, and download the operational profile onto the eUICC.

In detail, according to an exemplary embodiment, the first SM 210 is configured to communicate with the first MNO 310 and the second MNO 320, the second SM 220 is configured to communicate with the third MNO 330, the fourth MNO 340, and the fifth MNO 350, and the third SM 230 is configured to communicate with the sixth MNO 360 and the seventh MNO 370.

The first terminal 110 may communicate with the first SM 210 by using the first provisioning profile 11, and may communicate with the second SM 220 by using the second provisioning profile 12. In addition, according to an exemplary embodiment, the first SM 210 forms an interface with the first MNO 310 and the second MNO 320, and the second SM 220 forms an interface with the third MNO 330, the fourth MNO 340 and the fifth MNO 350. Accordingly, in an exemplary embodiment, the first terminal 110 having the first provisioning profile 11 and the second provisioning profile 12 may communicate with the first MNO 310 to the fifth MNO 350 using the first SM 210 and the second SM 220.

Meanwhile, the second terminal 120 may communicate with the first SM 210 by using the first provisioning profile 11, may communicate with the second SM 220 by using the second provisioning profile 12, and may communicate with the third SM 230 by using the third provisioning profile 13. In addition, according to an exemplary embodiment, the first SM 210 forms an interface with the first MNO 310 and the second MNO 320, the second SM 220 forms an interface with the third MNO 330, the fourth MNO 340, and the fifth MNO 350, and the third SM 230 forms an interface with the sixth MNO 360 and the seventh MNO 370. Accordingly, in an exemplary embodiment, the second terminal 120 with the first provisioning profile 11, the second provisioning profile 12 and the third provisioning profile 13 may communicate with the first MNO 310 to the seventh MNO 370 using the first SM 210, the second SM 220, and the third SM 230.

However, according to an exemplary embodiment, a terminal may selectively include one or more provisioning profiles, which does not mean that the terminal needs to include two or more provisioning profiles. In addition, an SM server may be selectively connected to perform communication with one or more MNO servers, which does not mean that the SM server should be able to communicate with two or more MNO servers.

Accordingly, in an exemplary embodiment, an eUICC mounted on a terminal includes at least one provisioning profile, and each of the at least one provisioning profile may provide communication with a subscription manager that supports at least one network operator.

Each of the at least one provisioning profile includes information related to a subscription manager and providing a communication with the subscription manager and an authentication credential for performing an authentication. The authentication credential may conform to an Authentication and Key Agreement (AKA) scheme.

In addition, according to an exemplary embodiment, a terminal may access a subscription manager by using a provisioning profile selected from the at least one provisioning profile, receive network operator information from at least one network operator supported by the accessed subscription manager, and download an operational profile for a certain network operator based on the network operator information.

That is, a terminal may receive support from a plurality of MNOs using a plurality of SMs by using an eUICC including at least one provisioning profile. Accordingly, a certain provisioning profile is selected from the at least one provisioning profile included in an eUICC mounted on or in the terminal, and the selected profile is used to connect to an MNO. Details thereof will be described in greater detail below.

Figure 2:
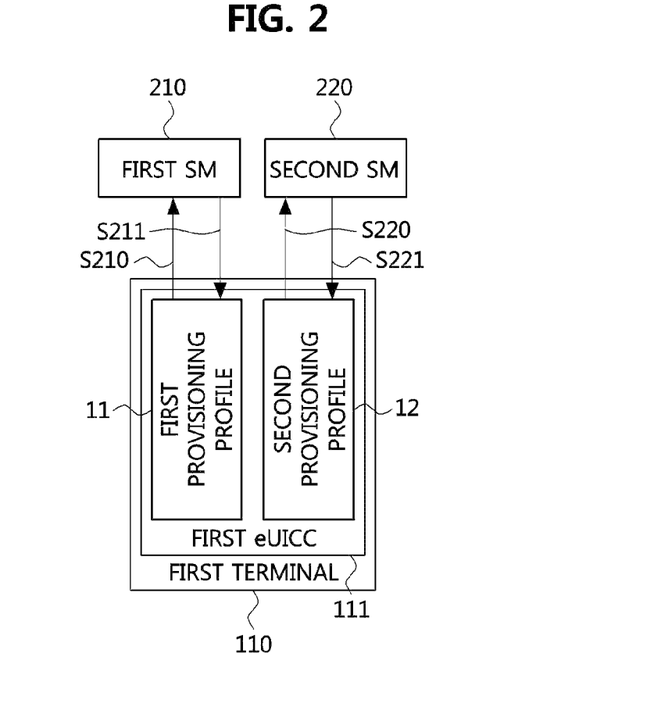
FIG. 2 is a conceptual diagram illustrating a procedure of a terminal obtaining network operator information by communicating with a subscription manager according to an exemplary embodiment.
Figure 3:
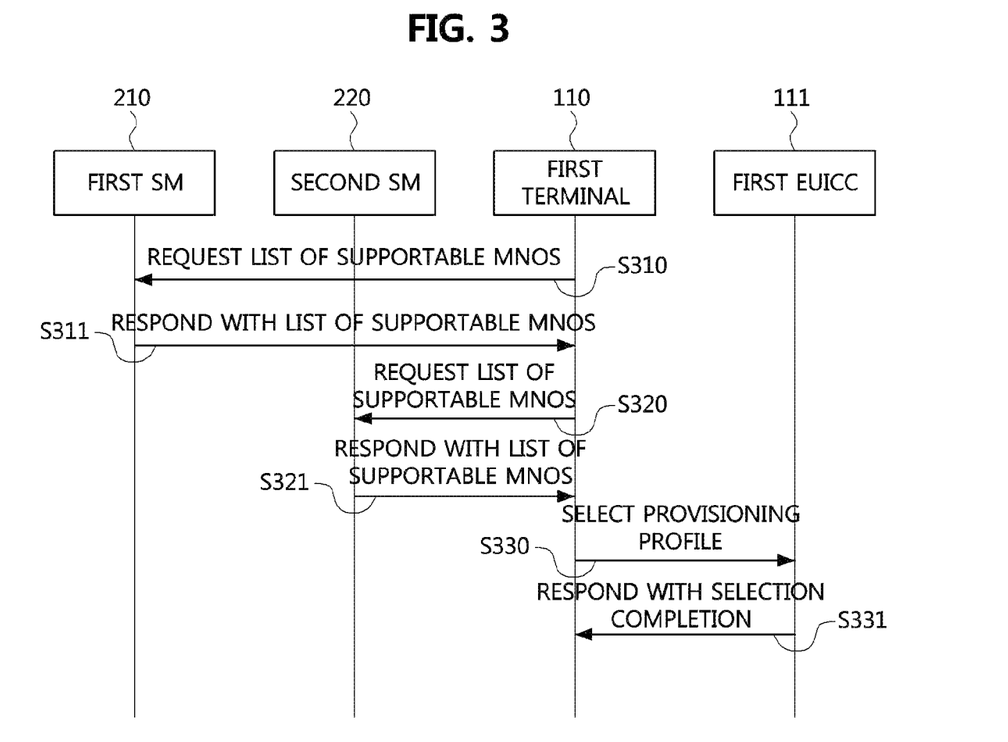
FIG. 3 is a flow diagram illustrating a method of selecting a provisioning profile according to an exemplary embodiment.

FIG. 2 is a flow diagram illustrating a method of obtaining network operator information by communicating with a subscription manager according to an exemplary embodiment, and FIG. 3 is a flowchart illustrating a method of selecting a provisioning profile according to an exemplary embodiment.

Referring to FIG. 2, a method of obtaining network operator information using the first SM 210 and the second SM 220 by the first terminal 110 will be described, according to an exemplary embodiment.

The first eUICC 111 (shown in FIGS. 1 and 2) mounted on or in the first terminal 110 has the first provisioning profile 11 and the second provisioning profile 12 (shown in FIGS. 1 and 2). Accordingly, in an exemplary embodiment, the first terminal 110 may communicate with the first SM 210 by using the first provisioning profile 11, and may communicate with the second SM 220 by using the second provisioning profile 12 (shown in FIG. 2).

A method of obtaining network operator information by the first terminal 110 by communicating with the first SM 210 using the first provisioning profile 11 will be described, according to an exemplary embodiment, with reference to FIG. 2.

The first terminal 110 may perform a security communication with the first SM 210 by using information about the first SM 210 and an authentication credential that are included in the first provisioning profile 11.

The first terminal 110 may request information about an MNO supported by the first SM 210 (in operation S210), and the first SM 210 having received the request from the first terminal 110 may generate a response including information about an MNO supported by the first SM 210 (in operation S211).

Similarly, the first terminal 110 may perform a security communication with the second SM 220 by using information about the second SM 220 and an authentication credential that are included in the second provisioning profile 12.

The first terminal 110 may request information about an MNO supported by the second SM 220 (in operation S220), and the second SM 220 having received the request from the first terminal 110 may generate a response including information about an MNO supported by the second SM 220 (in operation S221).

It should be understood that the first terminal 110 may select one of the first provisioning profile 11 and the second provisioning profile 12, and use only the selected provisioning profile, according to an exemplary embodiment.

Referring to FIG. 3, a method of selecting one of the first provisioning profile 11 and the second provisioning profile 12 in the first terminal 110 will be described in detail, according to an exemplary embodiment.

At least one subscription manager is accessed by using at least one provisioning profile included in an eUICC.

For example, the first terminal 110 with the first provisioning profile 11 and the second provisioning profile 12 may perform security communication with the first SM 210 and the second SM 220.

The terminal may request information about a list of network operators supported by each of the at least one subscription manager.

The first terminal 110 may request a list of MNOs supported by the first SM 210 based on the first provisioning profile 11 (in operation S310), and the first SM 210, upon receiving the request from the first terminal 110, may send to the first terminal 110 a response with a list of MNOs supported by the first SM 210 (in operation S311).

In detail, the first terminal 110 is connected so as to communicate with the first SM 210 by using the first provisioning profile 11, and may request a list of MNOs supported by the first SM 210, from the first SM 210 (in operation S310). The first SM 210, upon receiving the request from the first terminal 110, may generate a response which provides a list of MNOs supported by the first SM 210 in response to the request being determined to be valid. For example, if the request is made by a terminal that has succeeded in an authentication with the first SM 210 by using the authentication credential included in the first provisioning profile 11, the first SM 210 generates the response with a list of supported MNOs (in operation S311).

Similarly, the first terminal 110 may request a list of MNOs supported by the second SM 220 based on the second provisioning profile 12 (in operation S320), and the second SM 220 having received the request from the first terminal 110 may generate a response which includes a list of MNOs supported by the second SM 220 and transmit the generated response to the first terminal 110 (in operation S321).

In detail, according to an exemplary embodiment, the first terminal 110 is connected to communicate with the second SM 220 by using the second provisioning profile 12 of the eUICC, and may request a list of MNOs supported by the second SM 220 from the second SM 220 (in operation S320). The second SM 220, upon receiving the request from the first terminal 110, may transmit a response which includes a list of MNOs supported by the second SM 220 if the request is determined to be valid. For example, if the request is made by a terminal that has succeeded in an authentication with the second SM 220 by using the authentication credential included in the second provisioning profile 12, the second SM 220 generates the response with a list of supported MNOs (in operation S321).

However, the order in which the first terminal 110 accesses SM servers by using one or more provisioning profiles may be changed and is provided by way of an example only and not by way of a limitation. Exemplary embodiments are not limited to first communicating with the first SM 210 using the first provisioning profile 11. For example, the first terminal 110 may communicate with the second SM 220 using the second provisioning profile 12 first. In addition, according to an exemplary embodiment, the first terminal 110 may randomly select a provisioning profile that is used for the communication.

Moreover, according to an exemplary embodiment, the first terminal 110 may request a list of MNOs from an SM server using only some of the provisioning profiles included in the eUICC. That is, the first terminal 110 may not request a MNO list supported by the second SM 220 from the second SM 220 by using the second provisioning profile 12 if a MNO list desired by a user is obtained by communicating with the first SM 210 using the first provisioning profile 11. In other words, in an exemplary embodiment, not all of the provisioning profiles included in the eUICC may be used.

The terminal may receive input indicating a selection of a provisioning profile which establishes communication with a subscription manager that supports a certain network operator, based on information about a list of network operators (in operations 5330 and S331).

In addition, according to an exemplary embodiment, the terminal may access a subscription manager by using the selected provisioning profile, receive network operator information from at least one network operator supported by the accessed subscription manager, and download an operational profile for a certain network operator based on the received network operator information.

Accordingly, in an exemplary embodiment, when an eUICC mounted on or in a terminal includes one or more provisioning profiles, the terminal may communicate with one or more SM servers by individually using one or more provisioning profiles, and obtain MNO information for downloading an operational profile, for example, the name of an MNO, from the SM server.

Figure 4:
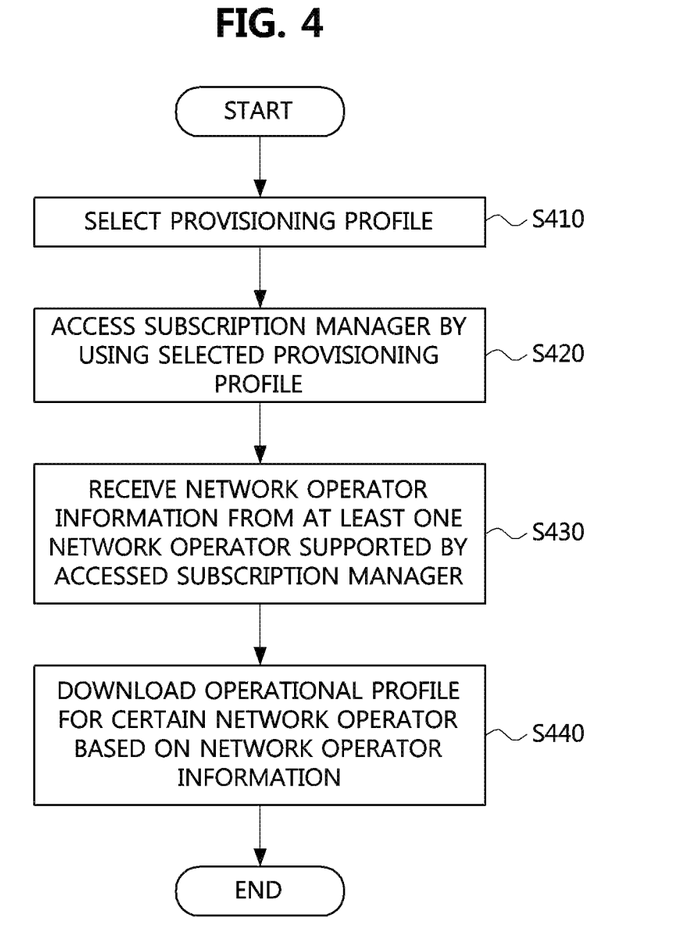
FIG. 4 is a flowchart illustrating a method of selecting a network operator according to an exemplary embodiment.
Figure 5:
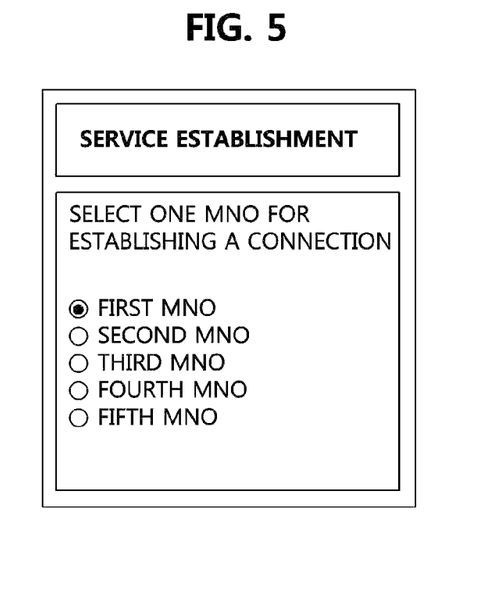
FIG. 5 is a view illustrating a user interface for selecting a network operator according to an exemplary embodiment.

FIG. 4 is a flowchart illustrating a method of selecting a network operator according to an exemplary embodiment, and FIG. 5 is a view illustrating a user interface for selecting a certain network operator according to an exemplary embodiment.

Referring to FIG. 4, a method of selecting a network operator may be performed by a terminal in which an eUICC including at least one provisioning profile is mounted.

The terminal may select a certain provisioning profile from the at least one provisioning profile, and access a subscription manager by using the selected provisioning profile. In addition, the terminal may receive network operator information from at least one network operator supported by the accessed subscription manager, and download an operational profile for a certain network operator based on the received network operator information.

According to an exemplary embodiment, the terminal may select a provisioning profile stored on the eUICC including the at least one provisioning profile (in operation S410).

The terminal may provide a user interface for selecting a network operator, and the user may select a network operator by using the provided user interface. That is, according to an exemplary embodiment, a terminal may display a list of network operators, and the user may select a certain network operator from the list of network operators, so that a provisioning profile that establishes communication with a subscription manager that supports the selected network operator may be selected.

Referring to FIG. 5, the terminal displays to a user a list of network operators (mobile network operators) with which a connection may be established, and the user may select a certain network operator from the displayed list of network operators. For example, the terminal may be able to establish a connection with the first MNO 310 to the fifth MNO 350, and the user may select the first MNO 310 from among the first MNO 310 to the fifth MNO 350.

The terminal may access a subscription manager by using the selected provisioning profile (in operation S420).

For example, a user may want the first terminal 110 to be connected with the first MNO 310 and thus, the user selects the first MNO 310. The first terminal 110 may access the first SM 210 by using the first provisioning profile 11 establishing communication with the first SM 210 that supports the first MNO 310.

The terminal may receive network operator information from at least one network operator supported by the accessed subscription manager (in operation S430). For example, when the first SM 210 is selected by the first terminal 110, the first terminal 110 may receive information about the first MNO 310 and the second MNO 320 using the first SM 210.

In addition, the terminal may download an operational profile for a certain network operator based on the network operator information (in operation S440). For example, the first terminal 110 may download an operational profile from the first MNO 310 or the second MNO 320 using the first SM 210.

The terminal having an eUICC mounted thereon according to an exemplary embodiment can select a certain provisioning profile from among at least one provisioning profile, and establish a network connection with a certain mobile network operator by using the selected provisioning profile.

In addition, according to an exemplary embodiment, a method of selecting a network operator may include requesting a list of supportable network operators from a subscription manager by using a terminal having at least one provisioning profile, and based on the list of supportable network operators received in response to the request, selecting a certain network operator for establishing of a connection.

In addition, the terminal and method of selecting a network operator according to an exemplary embodiment may improve and simplify establishing connections with multiple network operators by using the eUICC mounted on or in the terminal.

It will be apparent to those skilled in the art that various modifications, changes, substitutions can be made to the above-described exemplary embodiments without departing from the spirit or scope of an inventive concept. Thus, it is intended that the disclosure covers all such modifications, changes, and alterations provided they do not change a technical conception and/or any essential features of exemplary embodiments. Thus, above-described exemplary embodiments are exemplary in all aspects, and do not limit the present disclosure.

The invention claimed is:

1. A terminal comprising:
   an embedded universal integrated circuit card (eUICC), integrally formed with the terminal, the eUICC comprising a memory configured to store at least one provisioning profile and a processor configured to establish a connection using said at least one provisioning profile,
   wherein each of the at least one provisioning profile comprises information for establishing a connection with a subscription manager that supports at least one network operator, and
   wherein, upon receiving a selection of the at least one network operator from a list of network operators supported by subscription managers, the processor of the eUICC is configured to establish a connection to a network of the at least one network operator by using corresponding provisional profile within the eUICC.

2. The terminal of claim 1, wherein said each of the at least one provisioning profile further comprises information related to the subscription manager and an authentication credential for performing an authentication for the establishing of connection with the subscription manager.

3. The terminal of claim 2, wherein the authentication credential conforms to an Authentication and Key Agreement (AKA) scheme.

4. The terminal of claim 1, wherein the at least one provisioning profile comprises a plurality of provisioning profiles and wherein an access is made to the subscription manager by using a provisioning profile selected from among the plurality of provisioning profiles.

5. The terminal of claim 4, wherein network operator information is received from the at least one network operator supported by the accessed subscription manager and an operational profile for the at least one network operator is downloaded based on the network operator information.

6. The terminal of claim 5, further comprising a display configured to display a user interface for selecting the at least one network operator from among the network operators.

7. A method of selecting a network operator in a terminal, the method comprising:
   accessing at least one subscription manager by using at least one provisioning profile stored in an embedded universal integrated circuit card (eUICC) that is integrally formed with the terminal;
   receiving information about a list of network operators supported by each of the accessed at least one subscription manager;
   receiving a selection of at least one network operator from the list of network operators; and
   selecting a provisioning profile, from the at least one provisioning profile, comprising information for establishing a connection with a subscription manager that supports the at least one network operator based on the received selection.

8. The method of claim 7, further comprising:
   accessing the subscription manager by using the selected provisioning profile; and
   receiving network operator information from at least one network operator supported by the accessed subscription manager.

9. The method of claim 8, further comprising downloading an operational profile for the network operator based on the received network operator information.

10. The method of claim 9, wherein each of the at least one provisioning profile comprises information related to the subscription manager and an authentication credential for performing an authentication for the establishing of connection with the subscription manager.

11. The method of claim 10, wherein the authentication credential conforms to an Authentication and Key Agreement (AKA) scheme.

12. A method of selecting a network operator in a terminal, the method comprising:
   receiving a selection of at least one network operator from a list of network operators supported by at least one subscription manager;
   in response to receiving the selection, selecting a provisioning profile from among at least one provisioning profile stored on an embedded universal integrated circuit card (eUICC) that is integrally formed with the terminal;
   accessing a subscription manager by using the selected provisioning profile; and
   receiving network operator information from the at least one network operator supported by the accessed subscription manager.

13. The method of claim 12, further comprising downloading an operational profile for a network operator based on the received network operator information.

14. The method of claim 12, wherein each of the at least one provisioning profile comprises information related to the subscription manager and an authentication credential for performing an authentication with the subscription manager.

15. The method of claim 14, wherein the authentication credential conforms to an Authentication and Key Agreement (AKA) scheme.

16. A method of selecting a network operator in a terminal provided with an embedded universal integrated circuit card (eUICC) mounted thereon, the method comprising:
   selecting a provisioning profile from among at least one provisioning profile stored on the eUICC, wherein the at least one provisioning profile comprises a plurality of provisioning profiles;
   accessing a subscription manager by using the selected provisioning profile;
   receiving network operator information from at least one network operator supported by the accessed subscription manager;
   selecting an additional provisioning profile from the plurality of provisioning profiles;
   accessing an additional subscription manager based on the selected additional provisioning profile;
   receiving additional network operator information comprising information about a plurality of network operators supported by the accessed additional subscription manager;
   integrating the received additional network operator information with the received network operator information to generate a list of network operators supported by both the subscription manager and the additional subscription manager; and
   outputting the generated list of network operators.

17. The method of claim 16, further comprising:
   receiving a selection of a network operator from the network operators in the generated list;
   downloading to the terminal an operational profile of the selected network operator via a corresponding subscription manager; and
   establishing a connection to a network of the network operator using the downloaded operational profile.

* * * * *